(12) United States Patent
McIntyre

(10) Patent No.: US 12,472,373 B2
(45) Date of Patent: Nov. 18, 2025

(54) SYSTEM AND METHOD FOR THERAPEUTIC TREATMENT USING LIGHT AND PULSE MODULATION

(71) Applicant: Michael L. McIntyre, Dana Point, CA (US)

(72) Inventor: Michael L. McIntyre, Dana Point, CA (US)

( * ) Notice: Subject to any disclaimer, the term of this patent is extended or adjusted under 35 U.S.C. 154(b) by 751 days.

(21) Appl. No.: 16/352,169

(22) Filed: Mar. 13, 2019

(65) Prior Publication Data

US 2020/0289841 A1    Sep. 17, 2020

(51) Int. Cl.
| | |
|---|---|
| *A61N 5/06* | (2006.01) |
| *A61B 5/25* | (2021.01) |
| *A61N 2/00* | (2006.01) |
| *A61B 5/024* | (2006.01) |
| *A61N 1/40* | (2006.01) |

(52) U.S. Cl.
CPC .............. *A61N 5/0613* (2013.01); *A61B 5/25* (2021.01); *A61N 2/002* (2013.01); *A61N 2/004* (2013.01); *A61B 5/024* (2013.01); *A61N 1/40* (2013.01); *A61N 2005/0664* (2013.01)

(58) Field of Classification Search
CPC ...... A61N 5/0613; A61N 2/002; A61N 2/004; A61N 1/40; A61N 2005/0664; A61N 1/0456; A61N 1/06; A61N 2005/0626; A61N 5/0618; A61N 5/0622; A61N 2005/0637; A61N 2005/0652; A61N 2005/0659; A61N 2005/0663; A61B 5/25; A61B 5/024; A61B 5/02405

See application file for complete search history.

(56) References Cited

U.S. PATENT DOCUMENTS

| | | | | |
|---|---|---|---|---|
| 6,409,744 | B1 * | 6/2002 | Marchesi | A61F 7/00 606/13 |
| 6,520,903 | B1 * | 2/2003 | Yamashiro | A61N 2/002 600/9 |
| 2002/0198575 | A1 * | 12/2002 | Sullivan | A61N 5/0616 607/91 |
| 2009/0216299 | A1 * | 8/2009 | Dantus | A61N 5/0616 385/27 |
| 2010/0063487 | A1 * | 3/2010 | Van Straalen | A61N 5/0616 606/2 |
| 2010/0081970 | A1 * | 4/2010 | Pan | A61N 5/06 601/2 |
| 2017/0080246 | A1 * | 3/2017 | Knight | A61G 10/02 |

* cited by examiner

*Primary Examiner* — Eugene T Wu

(57) ABSTRACT

A system and method for a whole-body immersion bed or cabinet that permits the user to experience the therapy on their entire body at the same time. The therapy in its most basic form is a combination light, and sound therapy. Each therapy session includes a set of resonant frequencies and a set of beneficial light wavelengths applied to the user at the same time. The resonant frequencies are applied through specific pulses that are chosen based upon the condition that the therapy is attempting to treat. Additionally, the resonant frequencies may be applied through a frequency pulse generator. The frequency pulse generator is set to a pre-established set of frequencies that have been shown to be effective for treating each particular condition.

9 Claims, 4 Drawing Sheets

SYSTEM AND METHOD FOR THERAPEUTIC TREATMENT USING LIGHT AND PULSE MODULATION

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Many conventional means for providing device enabled therapeutic treatment to users are designed and implemented to focus on treated the user by destroying the bug or symptom utilizing external processes substances. These conventional means of device enabled therapeutic treatment to users often results in damaging the user's healthy cells in the surrounding environment of the cells that require treatment. This new damage to once healthy cells from conventional device enabled therapeutic treatment, yields newly damaged cells and side effects that create further stress on the body of the user that would not have existed but for the administration of the conventional means of device enabled therapeutic treatment to users.

Currently providing device enabled therapeutic treatment to users deals with administering various combinations of wavelengths, light, and auditory pulses to the user in order to improve the physical condition of the user. These device enabled therapeutic treatments are designed and implemented to target individual body parts.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
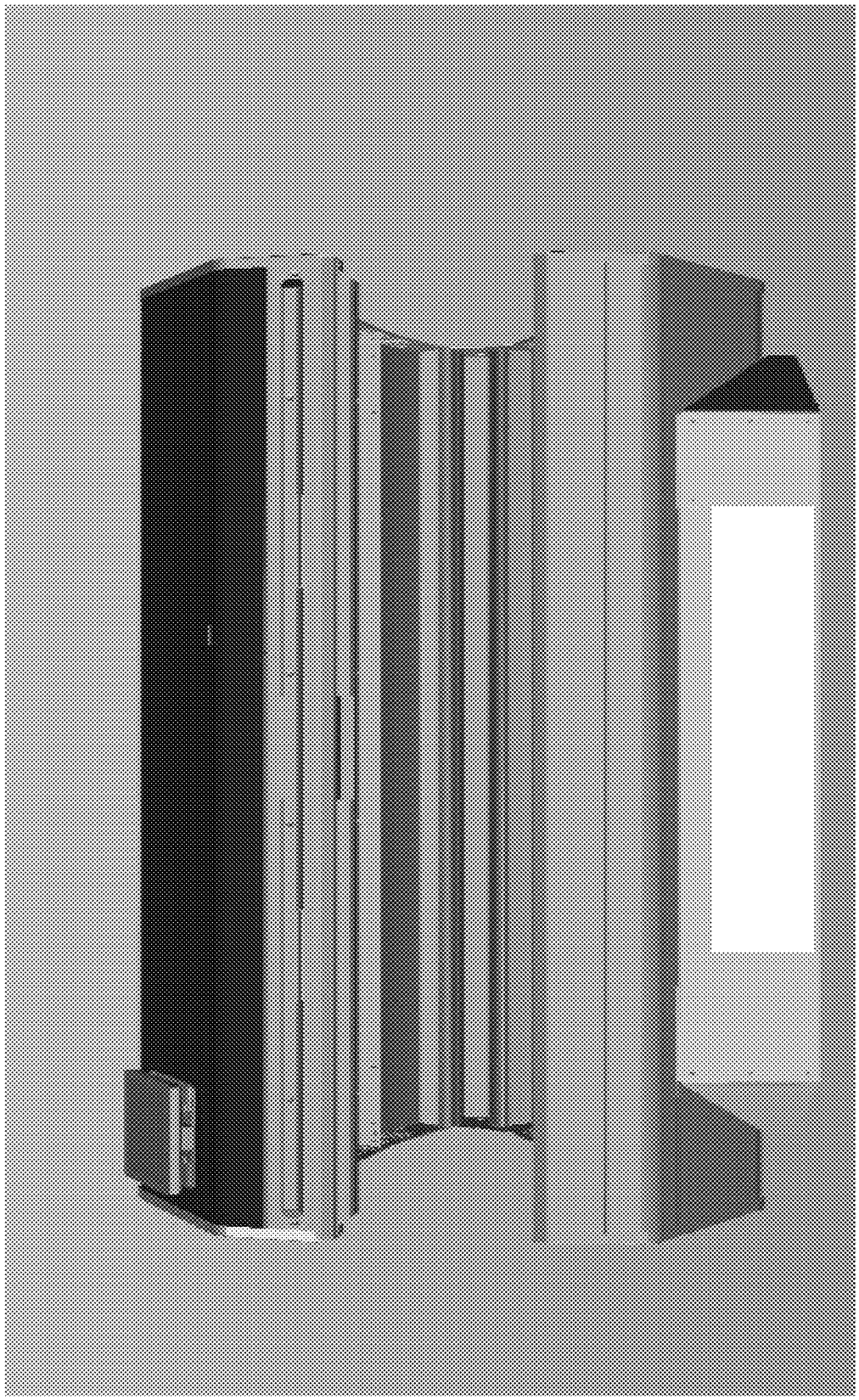
FIG. 1 is a view of the full body treatment PBM chamber consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "haptic" or "haptic therapy" refers to

Modern medicine is allopathic, meaning it is focused on 'destroying the bug', or symptom, with an external substance or process. The challenge of this theory of treatment is that in killing the bug, the process also damages the environment and health of the cells. This new damage creates additional stress on the body and new conditions or side effects may surface. Side effects can often be as damaging as the condition being treated. Any evaluation of the use of Opioids for pain relief can attest to the dangers inherent to this allopathic process.

In an embodiment, a solution to the problems generated by allopathic methods of treatment may be found in Energy Medicine, the use of photons, vibration and magnetic frequencies as applied to a human body to treat conditions and speed healing. Energy method techniques utilizing photons, vibration, and magnetic frequencies, either singly or in combination, have been shown in over 5,000 National Institutes of Health (NIH) posted studies to reduce pain, and in many cases, heal the root cause of a condition. Peer Reviewed Research is consistent in stating that these results happen free of side effects. The innovation disclosed herein present the merger of proven technologies into a singularly applied device that creates a synergy that amplifies the positive outcomes for a regimen of treatment without causing any side effects as a result of the treatment. The innovation herein described, in particular embodiments, presents a novel device that merges three proven healing technologies into a single system to provide methods of treatment based upon Energy Medicine.

In an embodiment, the system herein disclosed may consist of a whole body photobiomodulation chamber with unique electronic capabilities. Photobiomodulation (PBM) is a term that describes how light can positively stimulate cellular function. Research since NASA's groundbreaking work in 1996 has produced over 3,000 studies on PBM alone with over 500 Peer Reviews of the science in the intervening years. In an embodiment, the research suggests that PBM reduces cellular toxicity and inflammation while it improves energy function and circulation which in turn supports the health of the cells of a patient. As the cells get healthy, the benefits of good cellular health cascade down into nearly every tissue, organ and system in the body, free of negative side effects. The FDA has allowed Low Level Light Therapy (LLLT) to be exempt from regulation for minor aches and pains due to its proven non-invasive nature.

In an embodiment, Pulsed Electromagnetic Field Therapy (PEMF) likewise is supported by over 2,000 studies suggesting that pain relief, and reductions in inflammation can be triggered free of side effects.

Resonant Frequency is a term that describes how very specific frequencies may trigger an amplitude of vibration in an object. Resonant Frequencies can be used to align health within a system and or break down a pathogen. A non-limiting example of breaking down is that of a singer breaking a glass with her voice. The very specific vibration (sound) can create a resonant vibration that literally vibrates the object (glass) into breaking. Studies conducted as to the effects of Resonant Frequency are now showing that very specific resonant frequencies can break apart pathogens. Cancer cells for example have been shown to burst when their matching resonant frequency is applied through an electromagnetic pulse. Interesting research into hundreds of conditions with thousands of frequency protocols show that the frequency chosen can affect the condition to produce a result that is deadly to a pathogen and beneficial to a patient. Additionally, researchers are now suggesting that frequency modulation of light may also create and/or amplify the benefits of a specific, directed magnetic pulse. The innovative system utilizes full body light therapy chambers having PEMF and Radio Frequency (RF) capabilities and adding a frequency generator that modulates any one of 5 available wavelengths into a directed pulse delivery system of PBM and Electromagnetic Frequencies (EMF's) into the affected cells with the intent of destroying diseased cells, creating an opportunity for healthy cells to thrive and multiply without interference from the body's immune system response.

In an embodiment, the system herein presented is a locational, pulse directed and multi-pulse system that unites energies from waves of photons with electromagnetic waves. The system may use proven protocols to the dual intent of breaking down injured, damaged or diseased cells and stimulating the health of the body. In locational energy delivery, the system utilizes 32 control boards designed to focus different pulse rates at different organs. In a non-limiting implementation, the entire body for example might be hit with an anti-inflammatory pulse rate of 40 hertz while a stomach cancer would be targeted with a directed pulse that matches the resonant frequency of the cancer cell.

In a pulse directed energy delivery, the chosen LEDs are selected for wavelengths to focus on a particular condition, such as, in a non-limiting example, a condition such as stomach cancer. To direct the focus the wavelengths would be pulsed to generate the resonant frequency of the cancer cells of the stomach cancer to break them down and shrink any cancerous mass. As part of pulse directed energy delivery, the energy may be delivered in a multi-pulse implementation. In this embodiment the system may change the pulse rate either per wavelength or per location. In a non-limiting example, stomach cancer may respond better to a 10.577 megahertz pulse with an 810 nm near infrared LED source, while a 40 hertz pulse may be delivered to the remainder of the body to provide an anti-inflammatory effect.

In an embodiment, research labs have discovered evidence to show that the combination of light therapy with electromagnetic waves may create a synergy by combining the delivery of light therapy and electromagnetic waves simultaneously. The electrical and electronic components in the instant system from the outset have been designed to mimic localized pulse directed wavelengths of light to positively affect tissues, organs and systems.

In an embodiment, the innovation provides therapy through the use of a whole-body immersion device, such as, in a non-limiting example, a bed or cabinet, that permits the user to experience the therapy on their entire body at the same time. As previously recited, the therapy to be applied to a user within the whole-body immersion device in its most basic form is a combination of light and sound therapy. However, the therapy may also include haptic or rhythmic touch capability as well.

Each therapy session includes a set of resonant frequencies and a set of beneficial light wavelengths applied to the user at the same time. The resonant frequencies are applied through specific pulses that are chosen based upon the condition that the therapy is attempting to treat. Additionally, the resonant frequencies may be applied through pulsed electromagnetic frequency methods using a frequency pulse generator. The frequency pulse generator is set to a pre-established set of frequencies that have been shown to be effective for treating each particular condition. In a non-limiting example, a plasma wave may be generated at 27.15 KiloHertz to target particular conditions that respond to this frequency. Conditions to be treated and the set of resonant frequencies to which a particular condition responds have been pre-determined and will be imported as information to be used during therapeutic sessions.

It an embodiment, at the same time that a pulsed electromagnetic frequency is applied to a patient, a set of light wavelengths is selected and the user bathed in the set of light wavelengths. The set of combined wavelengths, referred to as polychromatic multi-wave therapy, should be defined very broadly as having red, green, blue and infrared components, but not being restricted to one particular set of light wavelengths but rather selected for the treatment of a pre-determined condition.

In an embodiment, the system can measure heart rate variability when a patient is in the whole-body chamber as a means of achieving coherence when heart rate becomes steadier. Steadier is defined as the decrease in the variability of the user's heart rate as measured by the duration and variance in the active beat of the heart and the time between the active beats. A sensor that monitors and captures the user's heart-beat, heart rate, and time between beats may be incorporated into the system to provide data for the analysis of a user's heart beat to determine when the user's heart rate becomes steadier as a function of the therapeutic light wavelengths being applied to the user when the user is inside the whole-body chamber and the therapy is active. In a non-limiting example, this sensor may be configured as a portion of an intranasal connective element that is attached to one or both nostrils of the user's nose and is in data communication, either wired or wirelessly, with the whole-body chamber. In a non-limiting example, the intranasal connective element is active to send duplicate frequencies and photons into the blood that travels to and feeds the brain of the user when inside the whole-body chamber.

In an alternative embodiment, the sensor that is active to monitor and capture the user's heart-beat, heart rate, and time between beats may be configured as an electrode that may be placed onto the ear lobe. This electrode attached to the earlobe may be used to measure heart rate and coherence of the measured heart rate parameters while the user is in the full-body chamber.

Additionally, a pulsed wavelength at 528 Hertz may be applied to form the haptic portion of the beneficial therapy in combination with the light and pmf therapies. The 528

Hertz frequency may be generated by speakers external to the container in which the patient is situated. The 528 Hertz frequency is the frequency at which water will vibrate, thus transmitting the pulse into human tissues as a touch. During the creation of a treatment plan for a particular condition, the plan may include the use of an electrode affixed to the user's earlobe to collect and record physiological data during treatment and the use of double pulses of light during treatment as a specific technique to which some conditions may be responsive.

System

The device herein disclosed is a full body LED Light Chamber having the dimensions of approximately 86.5" long, approximately 37" wide, and approximately 38" high. The whole-body treatment device may have an Aluminum Alloy Frame with 10993 biocompatible acrylic. The treatment device may also comprise the following physical elements of:

220 Volt 30 Amp power supply;
Onboard computer having a processor and memory;
Pulse Generator loaded with condition specific protocols;
32 Individual PCBs to direct the wavelength, pulse and location;
2 Power Bus boards;
2 Signal Bus boards;
12-volt power supplied for controls and computers;
3000 watts/48 V transformer powering 2304 LED's divided into 6 strings of lights producing the following wavelengths of light:
1×528 nm Green
1×633 Red
1×660 Red
2×810 NIR
1×850 NIR Treatment Devices:

In an embodiment, non-medical professionals would be offered a treatment device with 7 pulse directed protocols that do not require radiant frequency matching. These frequencies are applicable to the entire body free of negative side effects. Treatment protocols established for the device would include protocols for treating inflammation, stress relief, sleep, energy, mood, pain and grounding.

In an embodiment, medical professionals would be offered the pulse wave generator treatment device having greater capability and capacity for the treatment of various conditions. This treatment device could be configured with up to 2000 tested frequency protocols, each containing from 30-300 frequencies to be applied during a 15-minute treatment time, the number and wavelength of selected frequencies pre-configured for the condition to be treated during the treatment session. In these treatment methods, resonant frequencies target disease while PBM triggers cellular health.

In an embodiment, the system may also contain a plasma wave generator that pulses matching electromagnetic frequencies into the room in Double Pulse Resonant Frequency (DPRF) mode. This mode of operation may provide the ability to more deeply and consistently deliver the therapeutic healing frequencies into the tissues of the user. The plasma wave generator enables DPRF mode of therapy.

In an embodiment, the room housing the PBM chamber and PEMF generator would be built as a Faraday cage insulating the energies released in the room from the external environment. In this fashion external energies may not penetrate the treatment room to interfere with the therapeutic energies released during a user's immersion in the PBM chamber. The Faraday cage housing surrounding the treatment space also serves to contain the treatment energies within the treatment room for the benefit of the user of the system, insulating against outside interference and encapsulating the beneficial energies within the treatment space for the benefit of the user.

Turning now to FIG. 1, this figure presents a view of the full body treatment PBM chamber consistent with certain embodiments of the present invention. In an exemplary embodiment, the full body chamber 100 is configured to surround a user when involved in therapeutic action. The top portion of the full body chamber 100 is attached to one or more hinges (not shown) to permit the top portion to swing up and out of the way as a user enters the full body chamber 100, lying prone on the bottom portion of the chamber. Prior to the inception of the therapy session, the top portion is pulled down toward the user lying in the full body chamber such that the top side and the bottom side of the user will receive the benefit of the therapeutic healing frequencies during the therapy session.

Figure 2:
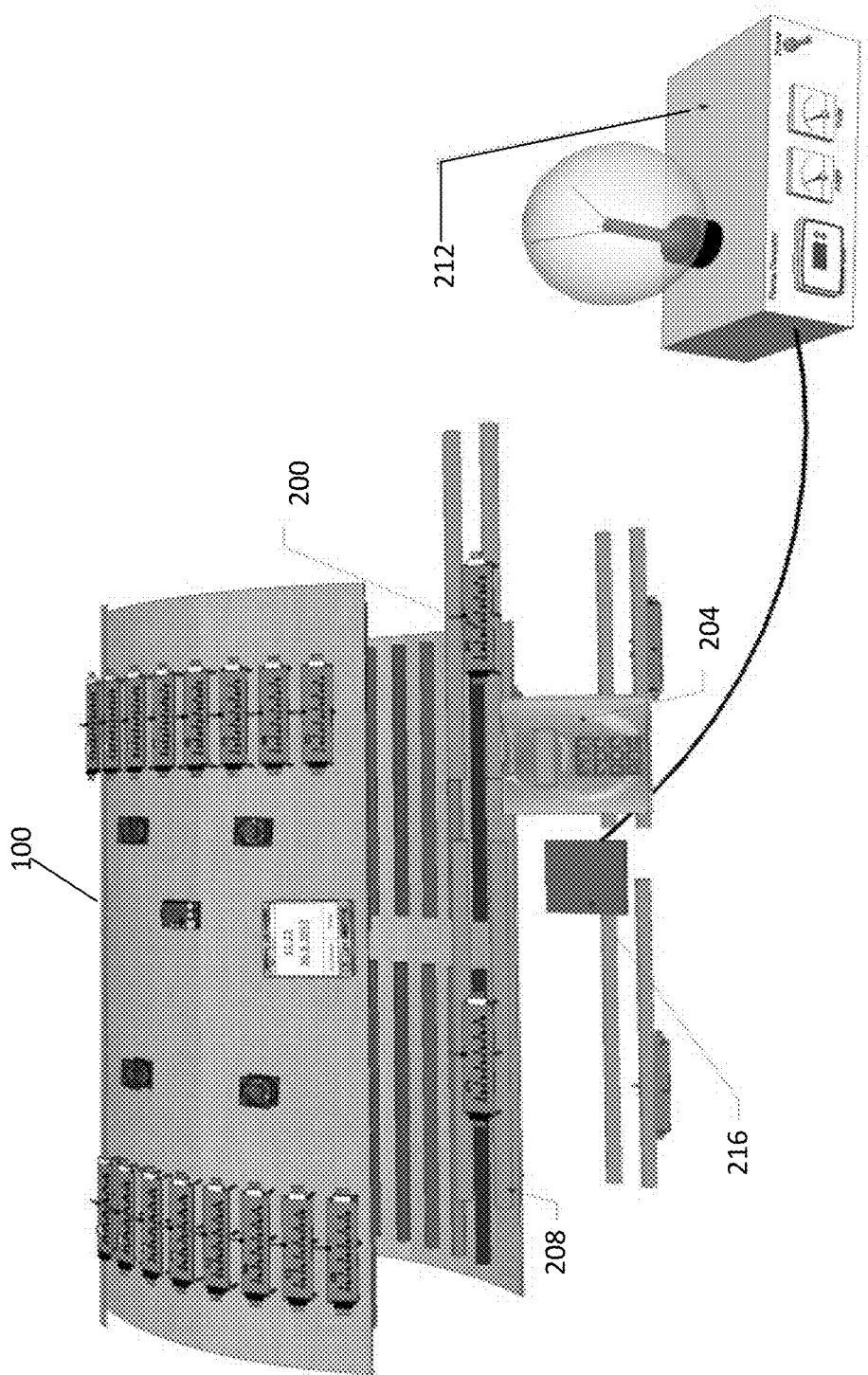
FIG. 2 is a view of the activation and control elements of the PBM chamber consistent with certain embodiments of the present invention.

Turning now to FIG. 2, this figure presents a view of the activation and control elements of the PBM chamber consistent with certain embodiments of the present invention. In an exemplary embodiment, the system presents the physical elements that provide the treatment through photobiomodulation and resonant frequencies. In an embodiment, the full body chamber may have 32 pulsing control boards 200 to focus different pulse rates at different organs, as well as providing an overall pulse to bathe the entire body in a single frequency. The pulsing control boards 200 may be under control of a medical practitioner or a non-medical practitioner user through the pulsing control pad 204. The pulsing control pad 204 may provide the user controls to set an automated program in place or permit a user to input sets of desired frequencies based upon the result the user desires to achieve. In a non-limiting example, a user may select a whole-body pulse at a 40 Hertz frequency while simultaneously targeting a disease or organ with a directed pulse that matches the resonant frequency of the targeted organ or targeted disease cells.

In an embodiment, the pulsing control pad 204 may direct the high frequency pulsing tubes 208 to select the frequencies to be delivered from each of the high frequency pulsing tubes 208 during a therapy session. Simultaneously, a plasma generator 212 may be active to deliver pulses of matching electromagnetic frequencies into the room in Double Pulse Resonant Frequency (DPRF) mode. The plasma generator 212 is attached to the full body chamber 100 through an interface board 216 to permit the synchronization between the pulsed frequency treatment and the DPRF treatment mode. The combination of treatments provide both light and sound frequencies targeted to conditions associated with the user contained within the full body chamber 100.

Figure 3:
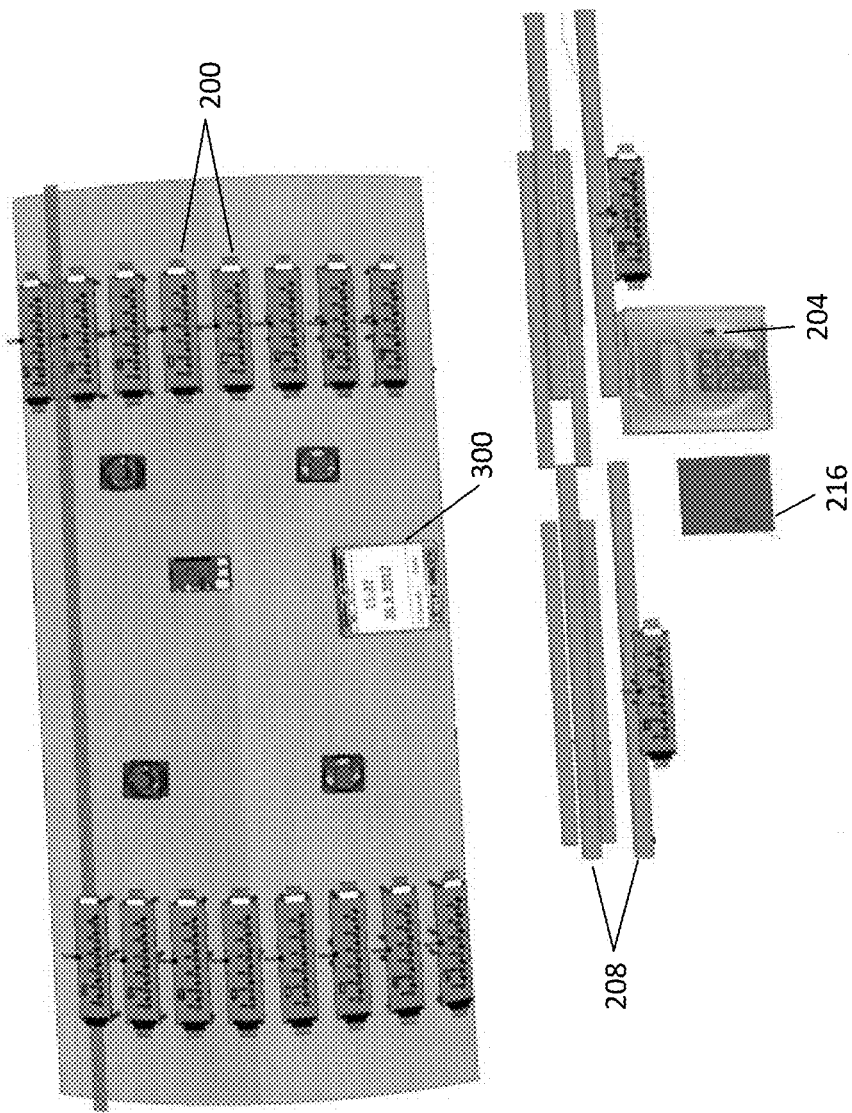
FIG. 3 is a view of the high frequency pulsing tube elements of the PBM chamber consistent with certain embodiments of the present invention.

Turning now to FIG. 3, this figure presents a view of the high frequency pulsing tube elements of the PBM chamber consistent with certain embodiments of the present invention. In an exemplary embodiment, the pulse control elements of the full body chamber are presented in isolation. In this embodiment, the high frequency pulsing control boards 200, high frequency pulsing tubes 208, pulsing control 204, and the board interface 216 to permit synchronization with a plasma generator are presented as a separate system for delivery of light therapy through specific light frequencies. Additionally, a user interface display 300 permits informational displays to a user that may include timing, frequency selections, or other informational displays to assist a user during the therapy experience.

Figure 4:
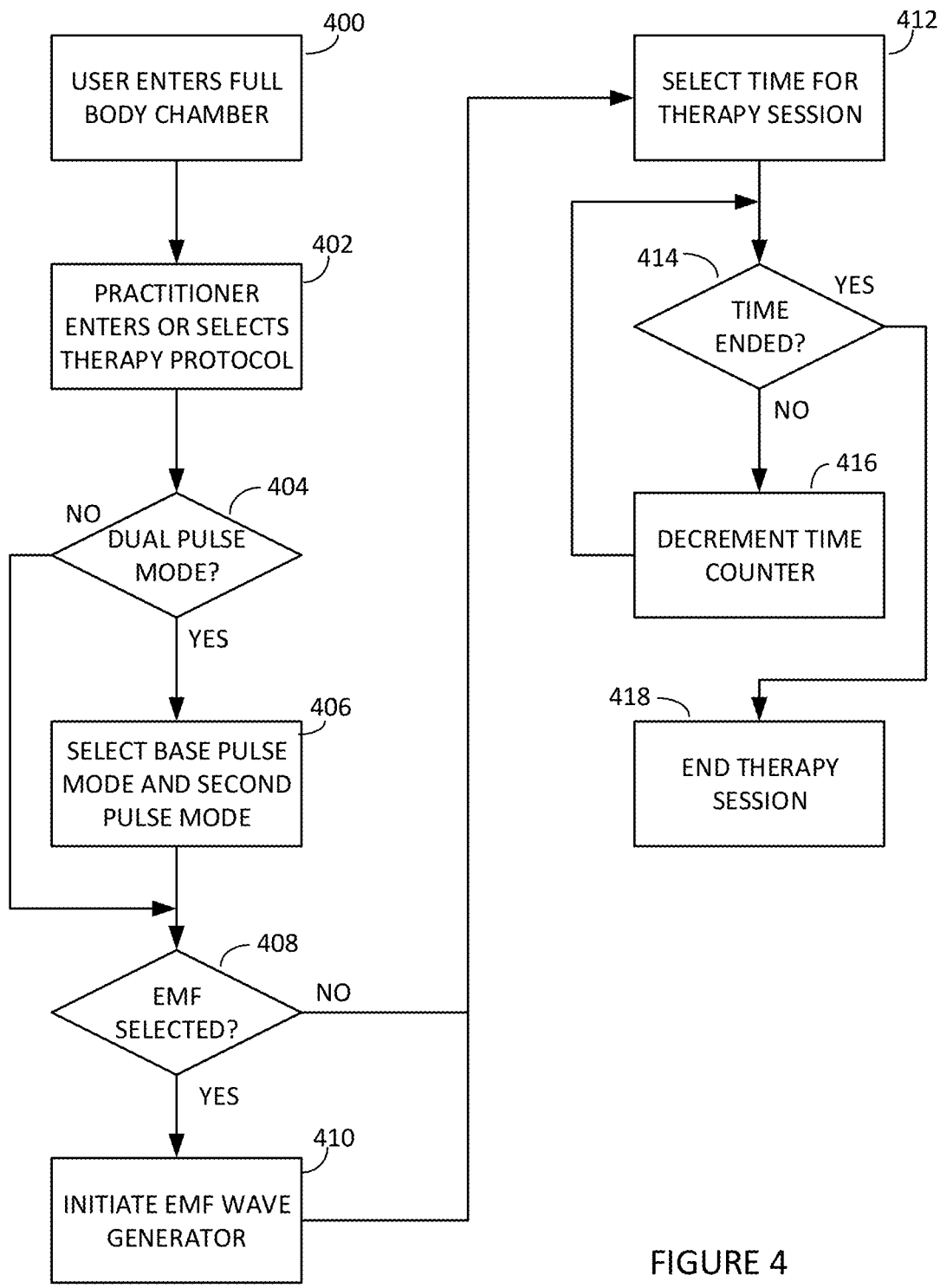
FIG. 4 is a flow diagram for treatment operation of the system consistent with certain embodiments of the present invention.

Turning now to FIG. 4, this figure presents an operational flow diagram for treatment operation of the system consistent with certain embodiments of the present invention. In this embodiment, at 400 the treatment for a user would begin with a user entering the full body chamber and reclining in the treatment chamber in such a way as to permit the treatment therapies to encompass the entirety of the user's body. At 402, a practitioner, or alternatively the user, serving as their own practitioner, may select a pre-stored protocol for a particular treatment, or may enter parameters for a particular desired therapy session. At 404, the practitioner or user may select either single pulse mode or dual pulse mode for the given therapy session. If the practitioner or user selects dual pulse mode delivery for the given therapy session at 406 the practitioner or user may select a base pulse mode for the entirety of the body such as, in a non-limiting example, an anti-inflammatory pulse rate of 40 hertz, and select a different poly-wavelength therapy to target a particular condition. If the practitioner or user selects a single pulse mode, the practitioner or user may instead enter either a single base pulse mode or a poly-wavelength mode for delivery of the therapeutic wavelengths of light and sound.

At 408, the practitioner or user may select the addition of EMF therapy to the dual or single pulse mode selected for the therapy session. If the practitioner desires to add EMF therapy to the session, at 410 an EMF wave generator will be engaged and synchronized with the previously selected wavelength therapy to deliver both light and sound pulses to the user during the therapy session. If the practitioner or user does not desire to add EMF therapy to the session the EMF wave generator will remain unengaged during the therapy session. At 412, the practitioner or user may be prompted to enter a time limit for the duration of the therapy session. The practitioner or user may enter the time limit and initiate the therapy session requested.

At 414, the system may check to determine whether the therapy session time limit has expired. At 416, if the therapy session time limit has not expired, the system will decrement the timer and continue the therapy session, checking the time limit periodically. At 418, if the therapy session time has elapsed the system will end the therapy session by ending the light poly-wavelength and/or emf delivery to the user through the full body chamber.

While certain illustrative embodiments have been described, it is evident that many alternatives, modifications, permutations and variations will become apparent to those skilled in the art in light of the foregoing description.

I claim:

1. A system for therapeutic treatment, comprising:
   a light therapy full body immersion device configured as a bed having an upper portion comprising a closeable lid and a lower portion comprising a bed to enclose a user, and a frequency generator;
   said light therapy immersion device configured to provide photobiomodulation treatment comprising visible light and infrared light wavelengths applied to the entire body of a user simultaneously;
   the frequency generator of said light therapy immersion device being configured to deliver a directed pulse delivery system of photobiomodulation (PBM) and electromagnetic frequencies (EMFs) into cells affected by disease;
   the light therapy immersion device being configured to deliver said PBM therapy to a user utilizing a plurality of LED light generation and emitting fixtures embedded within said closeable lid and embedded within said bed of the light therapy immersion device;
   said plurality of light emitting fixtures configured to generate and emit light in a pre-configured pattern of pulses in visible and infrared light wavelengths, where the pre-configured pattern of pulses in said visible and infrared light wavelengths is targeted for and and applied to break down injured, damaged, or diseased cells;
   the light therapy immersion device having a control pad;
   said control pad permitting the selection and input of sets of pre-selected visible and infrared wavelengths of light and light and audio pulse pattern instructions for a therapeutic sequence of energy delivery to said user during a therapy session utilizing said light generation and emitting fixtures;
   where the said sets of pre-selected visible and infrared wavelengths of light and light and audio pulse patterns are configured to simultaneously provide an anti-inflammatory effect in a whole body condition, and pulse patterns of said wavelengths of light to target and break down diseased cells;
   said therapeutic sequence of energy delivery utilizing a first treatment pattern for a whole body and a second treatment pattern to target a separate, specific body portion condition utilizing said second treatment pattern simultaneously within said full body immersion device.

2. The system of claim 1, further comprising said light generation and emitting fixtures generating bio-resonant whole-body single frequency and pulsed frequency stimulation of cellular function affecting the user to a combination therapy for treatment of a pre-determined condition.

3. The system of claim 2, where the pulsed frequencies generated by the light therapy immersion device are pre-configured to treat one or more health conditions of a user.

4. The system of claim 1, further comprising an electrode configured to be connected to the user within the light therapy immersion device to monitor and collect heart rate, heart-beat, and time between heart beats data of the user.

5. The system of claim 1, where pulse patterns are generated by the light therapy immersion device utilizing different pulse patterns for different physical locations on a user as combined treatments to simultaneously treat more than one condition.

6. The system of claim 1, where one or more combinations of visible and infrared light wavelengths are selected from experimentally derived protocols for treating inflammation, stress relief, sleep, energy, mood, and pain and are configured from experimentally derived protocols that target a particular body portion, set of cells, or user condition to deliver the desired treatment effect to the user.

7. The system of claim 1, where therapeutic pulse patterns are created and delivered by a plasma wave generator associated with the light therapy immersion device.

8. The system of claim 1, where the sets of light wavelengths selected through operation of the control pad for delivery to the user comprise a set of visible light wavelengths composed of a plurality of light wavelengths designed to provide a particular therapeutic effect on the user.

9. The system of claim 8, where the selected set of visible and infrared light wavelengths for the delivery of PBM treatment are comprised of any visible and infrared light wavelengths that result in the generation and delivery of red, blue, green, and/or infrared light as required for said treatment.

* * * * *